Oct. 14, 1930.  E. BAGNALL  1,778,056
SPRING CONTROLLER
Filed June 27, 1927
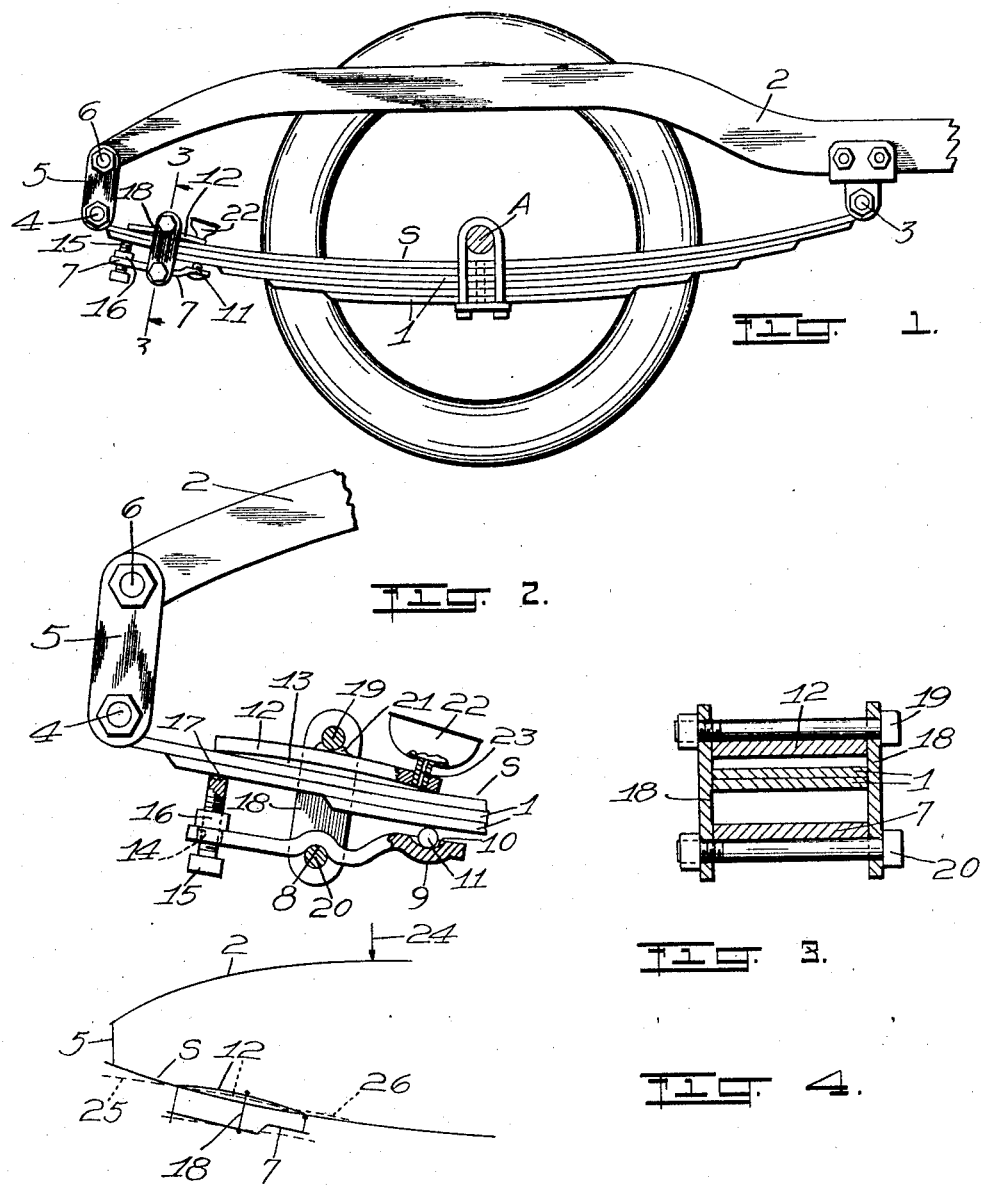
INVENTOR
E. BAGNALL
BY
ATTORNEYS Patented Oct. 14, 1930

1,778,056

UNITED STATES PATENT OFFICE

EDWIN BAGNALL, OF KENOSHA, WISCONSIN

SPRING CONTROLLER

Application filed June 27, 1927. Serial No. 201,753.

My invention relates to improvements in spring controllers, and it consists in the combinations, constructions, and arrangements herein described and claimed.

An object of my invention is to provide a spring controller which may be attached to vehicle springs in such a manner as to obviate the necessity of changing the shackles with which these springs are ordinarily equipped.

A further object is to provide a spring controller having means for automatically oiling the vehicle spring to which the controller is attached.

A further object is to provide a spring controller which is adapted to effectively control the action of the vehicle spring both on the bound and rebound, thus dampening the spring action so that the recoil is much slower, and at the same time improving the riding quality of the car and increasing the life of the spring.

A further object is to provide a spring controller having four points of contact with respect to the vehicle spring, thus lessening the force exerted upon a spring in that the force is applied at more than one point.

Other objects and advantages will appear in the following specification, and the novel features of the invention will be particularly pointed out in the appended claims.

My invention is illustrated in the accompanying drawings, forming part of this application, in which Figure 1 is a side elevation of my device as it would appear when attached to a vehicle spring, Figure 2 is an enlarged detail view, partly in section, of my device, Figure 3 is an enlarged sectional detail view taken along the line 3—3 of Figure 1, and Figure 4 is a diagrammatic view illustrating the spring action.

In carrying out my invention, I make use of a vehicle spring S secured to an axle A as shown in Figure 1. The spring in the present instance is of the semi-elliptic type comprising a series of progressively shorter spring leaves 1. In Figure 1, I have shown the spring S carried by the rear end of a vehicle frame 2. The forward end of the spring S is pivoted at 3 to the frame 2. The rear end of the spring is pivoted at 4 to shackles 5, which, in turn, are pivotally secured at 6 to the frame 2. The structure defined so far forms no part of my invention.

My invention in the present instance consists in the provision of a flexible member 7, preferably of spring steel, bent at 8 to form a recess, as shown in Figure 2. The flexible member 7 is further formed as at 9 to provide a recess 10 to receive a ball 11. The ball 11 is positioned to bear against the under surface of one of the spring leaves 1.

A slightly curved spring steel member 12 is placed on the top of the spring S and directly over the member 7. As will be seen from Figure 2, the curved member 12 bears against one of the spring leaves 1 at two points so that there is a space 13 between the member 12 and the spring S.

One end of the member 7 is provided with an opening 14 through which a set screw 15 is inserted. A nut 16 is placed on the set screw 15 and adjacent the flexible member 7 so that the nut is between the flexible member 7 and the under surface of the spring S. The set screw 15 is cut at 17 so as to form an end which will prevent movement of the set screw with respect to the leaf with which it is in contact. As will be seen from Figure 2, that end of the set screw 15 which is in contact with one of the spring leaves 1 is directly underneath one end of the curved member 12.

Referring to Figure 2, it will be seen that the flexible member 7 and the curved member 12 are held in contact with the spring S by the provision of shackles 18. Bolts 19 and 20 pass through the shackles 18. The bolt 19 bears against the upper surface of the member 12 and is held against longitudinal movement with respect to the curved member 12 by reason of lugs 21, as shown in Figure 2. The bolt 20 is received within the recess 8, which likewise prevents longitudinal movement of the shackles 18.

An oil cup 22 is secured to one end of the curved member 12 and is provided with a small passageway 23 which is designed to permit oil to pass from the cup 22 through the curved member 12 and in contact with the spring S.

From the foregoing description of the various parts of the device the operation thereof may be readily understood. The curved member 12 is placed on the concave side of the vehicle spring S and the flexible member 7 is placed directly opposite the curved member 12; that is, on the convex side of the main spring S, so that when the two are placed in position, the set screw 15 is directly opposite one point of the member 12 and the ball 11 is directly opposite the other end of the curved member 12. It will now be seen that the bolt 20 provides a fulcrum for the flexible member 7. When a shock occurs, the tendency of course is for the main spring S to straighten out, and during the recoil considerable damage is occasionally done by reason of the fact that the main leaf; that is, the long leaf, which is mounted to the frame, must necessarily absorb substantially all of the shock due to the recoil.

Referring to Figure 4, which is a diagrammatic showing of the spring action, it will be seen that when a shock occurs, the frame 2 is driven downwardly as illustrated by an arrow 24, and the shock is transmitted to the shackle 5, which, in turn, results in a downward movement of the spring S. Since this movement is rapid, the extreme end of the spring S is caused to bend, as shown at 25, by reason of the set screw 15 which bears against the under side of the spring. As the movement of the main spring S is downward, this movement will of course cause the flexible member 7 to pivot on the bolt 20, which, in turn, will cause the ball 11 to be moved upwardly against the convex side of the main spring S, counterflexing the main spring as shown at 26. The counterflexing of the main spring S causes the spring leaves 1 to be bound together so that the recoil of the main spring is dampened. Since the curved member 12 is flexible and is spaced away from the concave side of the main spring S, it will be seen that when the frame 2 is suddenly moved downwardly, a great amount of the shock is absorbed by the member 12, thus reducing to a considerable extent the shock which naturally would otherwise occur to the main spring S.

It will be further observed that since the curved member 12 bears against the concave side of the spring S at two points, the wear is considerably less on the main leaf of the spring. There is a tendency when only one point of contact is provided for the main leaf to crystallize at the point of contact.

During the operation of the device, the oil within the container 22 passes slowly through the opening 23 and into contact with the main spring S. When once the oil has reached one or two of the leaves 1, it of course spreads to other parts of the main spring S as the spring leaves flex, thus oiling the entire vehicle spring. While the opening 23 is very small, there is, however, suction created during the flexing of the member 12 which is sufficient to cause oil to be moved through this opening.

It will be further seen that during the recoil; that is, when the frame 2 moves upwardly, the end of the main spring S will be caused to move upwardly, but, since a number of the leaves 1 are bound together by reason of the shackles 18 and the bolts 19 and 20 which pass over the member 12 and under the flexible member 7, any movement of the main leaf will result in a similar movement of the leaves 1 which are bound together by reason of my device, thus transmitting the shock which is ordinarily confined to the main leaf to the other leaves which are bound together.

While I have shown my device attached to the rear end of a rear vehicle spring, it will be understood that the device may be attached to either end or both ends for that matter of the rear or front spring.

Referring to Figure 2, it will be seen that the controller effect can be adjusted by merely tightening or loosening the nut 16. Thus the proper tension is always easily attained.

The movable ball 11 permits the spring S to lengthen with a minimum of resistance as when the spring is straightened out when the vehicle is given a sudden jar.

Referring to Figure 2, it will be noted that the curved member 12 is spaced slightly away from the main spring. During the bound and rebound of the automobile, movement of the member 12 will be caused with respect to the main spring, thereby moving the member 12 closer to the main spring at certain times. The oil within the container 22 will of course naturally flow through the opening 23 and into the space 13 between the member 12 and the main spring. Suction occurs when the space 13 is increased during the spring action. This suction of course is very slight, but when there is a certain amount of oil within the space 13 adjacent the container 22, movement of the curved member 12 with respect to the main spring will of course create sufficient suction and action to spread the oil from the container 22 to certain portions of the main spring surrounding the container 22.

I claim:

1. The combination with a vehicle frame and a vehicle spring pivotally mounted on said frame, said spring comprising a series of spring leaves disposed in frictional engagement with each other, of a flexible member disposed adjacent the convex side of said vehicle spring, means carried by each end of said flexible member and arranged to bear against the convex side of said vehicle spring, a curved flexible member disposed on the concave side of said vehicle spring and arranged to bear against said vehicle spring at two points, and a fulcrum for operatively holding said curved member and said flexible member in engagement with said vehicle spring.

2. The combination with a vehicle frame and a vehicle spring pivotally mounted on said frame, said spring comprising a series of spring leaves disposed in frictional engagement with each other, of a flexible member disposed adjacent the convex side of said vehicle spring, movable means carried by one end of said flexible member and arranged to bear against said vehicle spring, an adjustable means disposed on the opposite end of said flexible member, a curved flexible member disposed adjacent the concave side of said vehicle spring, one end of said curved member being arranged to bear against said vehicle spring at a point directly opposite said adjustable means, the other end of said curved member being arranged to bear against the vehicle spring at a point directly opposite said movable means, and a shackle arranged to hold said curved member and said flexible member in operative engagement with said vehicle spring.

3. The combination with a vehicle frame and a vehicle spring pivotally mounted on said frame, said spring comprising a series of spring leaves disposed in frictional engagement with each other, of a flexible member disposed adjacent the convex side of said vehicle spring, one end of said flexible member having a recess, a movable ball carried within said recess and arranged to bear against the convex side of said vehicle spring, a shackle, a bolt passing through said shackle and constituting a fulcrum for said flexible member, adjustable means disposed on the other end of said flexible member, said adjustable means being arranged to bear against the convex side of said vehicle spring, a curved member disposed on the concave side of said vehicle spring, said curved member being arranged to bear against said vehicle spring at points directly opposite said adjustable means and said movable ball, a bolt passing through said shackle and arranged to bear against said curved member, said shackle and said first and last-named bolts being arranged to hold said curved member and said flexible member in operative engagement with said vehicle spring for causing said vehicle spring to counterflex, and means carried by said curved member for permitting oil to pass through said curved member and into contact with said vehicle spring.

4. A spring controller comprising a flexible member disposed upon the convex side of a vehicle spring, means carried by each end of said flexible member and arranged to engage the convex side of the vehicle spring, a curved member disposed on the concave side of said vehicle spring and having its ends engaging the vehicle spring at points substantially opposite the points of contact of the means carried by the flexible member, and fulcrum means for operatively holding said curved member and said flexible member in operative engagement with said vehicle spring.

5. A spring controller comprising a movable member disposed upon the convex side of a vehicle spring, bearing means carried by one end of said member and disposed in contact with a portion of the convex side of the spring, adjustable means carried by the other end of said member and engaging a portion of the spring, a curved member disposed upon the concave side of the spring and having its ends engaging the spring at points substantially opposite the points of contact between the bearing means and the adjustable means with the spring, and means for operatively holding said member and said curved member in operative engagement with said vehicle spring.

6. A spring controller comprising a flexible member disposed upon the convex side of a vehicle spring and having a plurality of points of contact with the convex side of the spring, a second flexible member disposed upon the concave side of the spring and having a plurality of points of contact with the concave side of the spring, means for operatively holding said first and second named flexible members in engagement with the vehicle spring, and lubricating means associated with one of said flexible members and arranged for depositing a lubricant upon the spring when said flexible member is flexed.

7. The combination of a vehicle frame and a vehicle spring carried thereby, an auxiliary spring member disposed upon one side of the spring and having a plurality of points of contact with the latter, a second auxiliary spring member disposed upon the opposite side of the spring and having a plurality of points of contact with the latter, means for holding said first and second named spring members in operative engagement with said vehicle spring, and lubricating means associated with one of said flexible members and arranged for depositing a lubricant upon the spring when said flexible member is flexed.

EDWIN BAGNALL.